United States Patent
Guillemard et al.

(10) Patent No.: US 11,145,928 B2
(45) Date of Patent: Oct. 12, 2021

(54) BATTERY PACK FOR A DISTRESS BEACON

(71) Applicant: OROLIA SAS, Guidel (FR)

(72) Inventors: Vincent Guillemard, Lorient (FR); Michel Penn, Riec sur Belon (FR)

(73) Assignee: OROLIA SAS, Guidel (FR)

( * ) Notice: Subject to any disclaimer, the term of this patent is extended or adjusted under 35 U.S.C. 154(b) by 246 days.

(21) Appl. No.: 16/274,563

(22) Filed: Feb. 13, 2019

(65) Prior Publication Data
US 2019/0252652 A1  Aug. 15, 2019

(30) Foreign Application Priority Data

Feb. 14, 2018 (FR) ...................................... 1851231

(51) Int. Cl.
  *H01M 50/213* (2021.01)
  *B64D 45/00* (2006.01)
  *H01M 50/147* (2021.01)
  *H01M 50/383* (2021.01)
  *H01M 50/30* (2021.01)

(52) U.S. Cl.
  CPC .......... *H01M 50/213* (2021.01); *B64D 45/00* (2013.01); *H01M 50/147* (2021.01); *H01M 50/383* (2021.01); *H01M 50/394* (2021.01); *B64D 2045/0065* (2013.01)

(58) Field of Classification Search
  CPC ................................................. H01M 50/213
  See application file for complete search history.

(56) References Cited

U.S. PATENT DOCUMENTS

| 2009/0197153 A1 | 8/2009 | Fujikawa et al. |
| 2015/0162582 A1* | 6/2015 | Metz ................... H01M 2/1252 429/53 |
| 2015/0221914 A1 | 8/2015 | Page et al. |
| 2016/0293910 A1 | 10/2016 | Claudel |
| 2017/0237054 A1 | 8/2017 | Mast |

FOREIGN PATENT DOCUMENTS

| FR | 2993522 A1 | 1/2014 |
| JP | 2001229982 A | 8/2001 |

OTHER PUBLICATIONS

French Search Report dated Sep. 18, 2018 for corresponding French Application No. 1851231, filed Feb. 14, 2018.
Machine translation of the European Office Action dated Feb. 13, 2020 for corresponding European Application No. 19154652.2.
English translation of the French Written Opinion dated Sep. 18, 2018 for corresponding French Application No. 1851231, filed Feb. 14, 2018.

* cited by examiner

*Primary Examiner* — Jonathan Crepeau
(74) *Attorney, Agent, or Firm* — David D. Brush; Westman, Champlin & Koehler, P.A.

(57) ABSTRACT

A battery pack includes a plurality of electrical energy storage cells positioned in a parallel layout in a protective casing. The protective casing has a peripheral wall and is closed at two opposite ends by a lid. Each of the lids has at least one venting hole for gases that that can form inside the protective casing, and at least one layer of metallic material, through which the gases are intended to flow, is disposed between the internal face of each of the lids and the cells.

10 Claims, 3 Drawing Sheets

BATTERY PACK FOR A DISTRESS BEACON

TECHNICAL FIELD OF THE INVENTION

The technical field of the invention is that of battery packs for electrochemical generators such as lithium batteries and cells.

The invention relates more particularly to the protection of a battery pack of electrochemical generators against the consequences of thermal runaway.

The invention also relates to a distress beacon equipped with such a battery pack.

PRIOR ART

The distress beacons with which aircraft are equipped, also called emergency locator transmitters, are powered by an internal battery, independent of the electrical circuit of the aircraft, that is intended to provide the electrical energy needed for the beacon to function independently for a few days in the event of distress.

The signal that the beacon sends out (conventionally in the 406 MHz frequency band) in the event of distress, in order to give the location of the aircraft, is then received by one or more Cospas-Sarsat network satellites.

In this type of beacon, the battery is generally formed by a plurality of electrical energy storage cells made of lithium.

These cells are disposed in a rigid protective casing in order to form what is called a battery pack.

Thermal runaway in a cell is the most dreaded risk presented by batteries made of lithium.

This phenomenon of thermal runaway is the cause of a number of accidents with consequences of varying degrees of seriousness.

A great increase in the temperature of a cell can thus cause the battery to burst into flames, thus releasing a large quantity of fumes and flames and even causing the explosion of the battery and the projection of debris.

The safety of batteries made of lithium inside beacons therefore is a major issue to be resolved.

SUMMARY OF THE INVENTION

The invention is aimed at proposing an improved battery pack for a distress beacon, especially one that mitigates at least some of the drawbacks of the prior art mentioned here above.

To this end, the invention relates to a battery pack intended for example to equip a distress beacon comprising a plurality of electrical energy storage cells positioned in a parallel layout in a protective casing, said protective casing comprising a peripheral wall and being closed at two opposite ends by a lid.

According to the invention, each of the lids comprises at least one venting hole for gases that that can form inside the protective casing, and there is at least one layer of metallic material, through which the gases are intended to flow, that is disposed between the internal face of each of the lids and the cells.

The invention proposes the implementing, in the venting path of the fumes produced by the thermal runaway of a cell within a battery pack, of a body that is permeable to the passage of the fumes.

The above-mentioned body comprises a mass of metallic material to absorb the heat in order to extinguish the flames that can appear during such thermal runaway.

The flames are extinguished within an extremely short time span, therefore preventing them from spreading outwards.

The gases under pressure that can get formed inside the pack can escape through holes made in the lids of the casing.

According to one particular aspect of the invention, the protective casing comprises several reception housings for receiving a cell each.

Advantageously, partition walls made of plastic extend within the protective casing between the reception housings of the neighboring cells.

According to particular implementations of the invention, said at least one layer of metallic material takes the form of a network of metal wires or of a metallic foam.

In variants of implementation, the layer can be a lattice of metal wires or compacted metal chips or a mixture of the two.

The metallic mass instantaneously absorbs the heat of the fumes, reduces the temperature and prevents the propagation of the flames.

It furthermore enables absorption of explosions, if any, of one or more cells.

Preferably, the battery pack comprises means for the reversible affixing of the lids to said protective casing.

According to one particular implementation of the invention, the cells are cells having one electrode composed of lithium.

The cells are lithium-sulfur cells (Li—S) or lithium-manganese dioxide (Li—$MnO_2$) cells or lithium-thionyl chloride (Li—$SOCl_2$) cells, for example.

Preferably, at least one layer of electrically insulating material is disposed between said at least one layer of metallic material and the cells.

According to one particular aspect of the invention, each lid carries, on its internal face, at least one wall in the form of a baffle defining a path of flow of the gases from the interior of the casing towards at least one venting hole.

Thus, the baffles formed by the internal face of the lids force the gases to propagate indirectly towards the exit holes.

The invention also relates to a distress beacon comprising a battery pack as described here above.

LIST OF FIGURES

The invention as well as its different advantages will be understood more easily from the following description of an embodiment of this invention, given by way of a simple illustratory and non-exhaustive example and from the appended figures, of which:

DETAILED DESCRIPTION OF THE INVENTION

Figure 1:
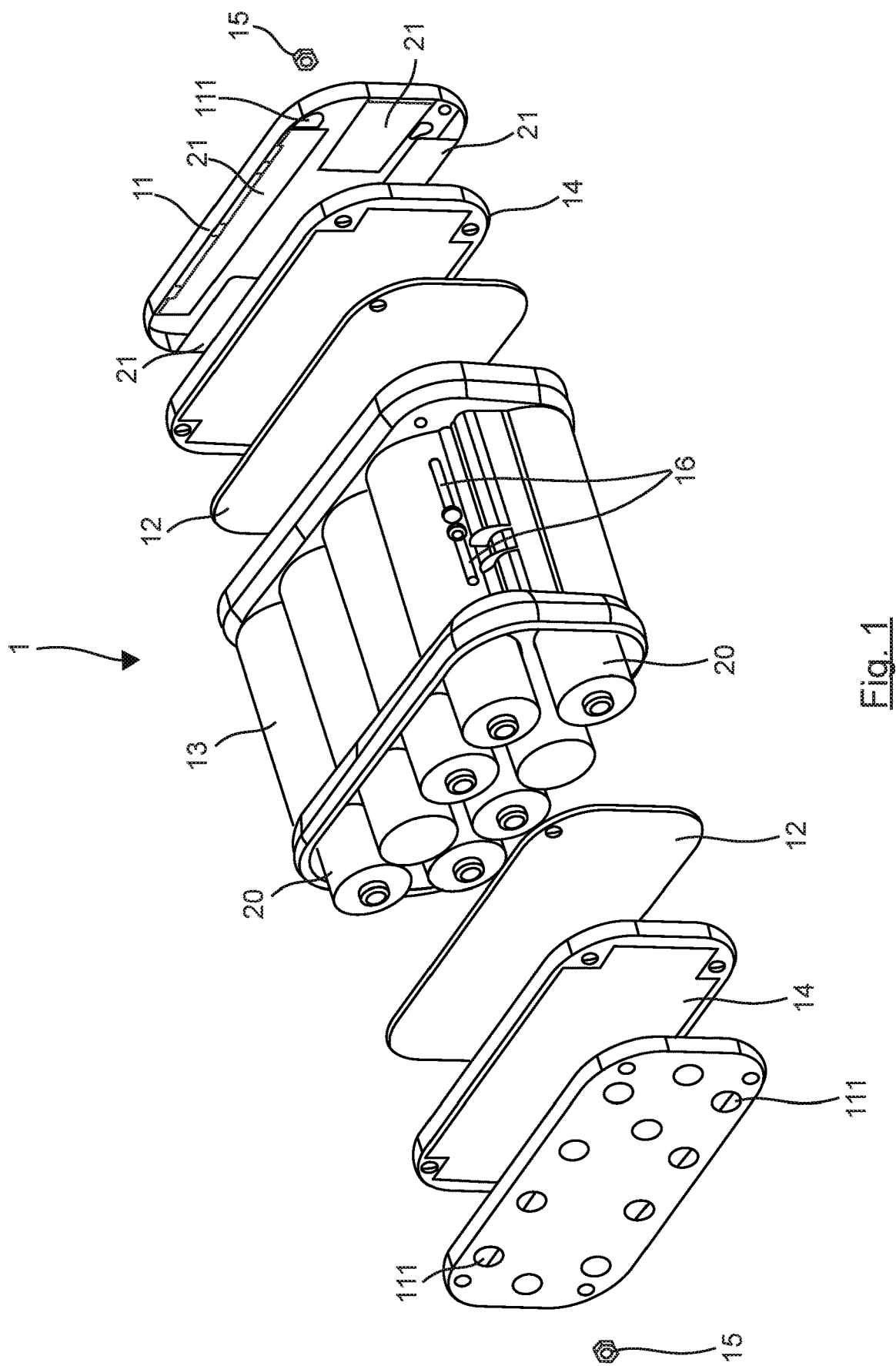
FIG. 1 is an exploded view of a battery pack according to the invention.

FIG. 1 is an exploded view of a battery pack according to the invention.

The battery pack 1 comprises a plurality of cylindrical, electrochemical cells 20 and a rigid and waterproof protective casing 13 in which the plurality of cells 20 is positioned according to a parallel layout.

Partition walls 132 are positioned between the neighboring cells 20.

The plastic casing 13 for receiving cells 20 is plugged in a tightly sealed manner, at its two opposite ends, by two closing lids 11.

At least one plate or layer 12 formed by an electrically insulating material permeable to fumes, such as polyamide foam (PA), is disposed between each lid 11 and the plurality of cells 20.

These cells 20 are made of lithium and are for example non-rechargeable lithium-sulfur (Li—S) or lithium-manganese dioxide (Li—$MnO_2$) or lithium-thionyl chloride (Li—$SOCl_2$) cells.

Screws 16 and nuts 15 affix the lids 11 and the plates 12 to the casing 13.

At least one layer or plate 14 of metallic material is disposed between each lid 11 and the corresponding insulating plate 12.

Each lid 11 has holes 111 for the venting or exhaust of hot gases, that can form within the casing during thermal runaway of a cell 20, from the interior towards the exterior of the casing 13.

Each lid comprises, on its inner face, metal walls or plates 21 forming baffles that prevent a direct exit of the gases and increase their exit path through the metal lattices forming the plate 14.

Figure 2:
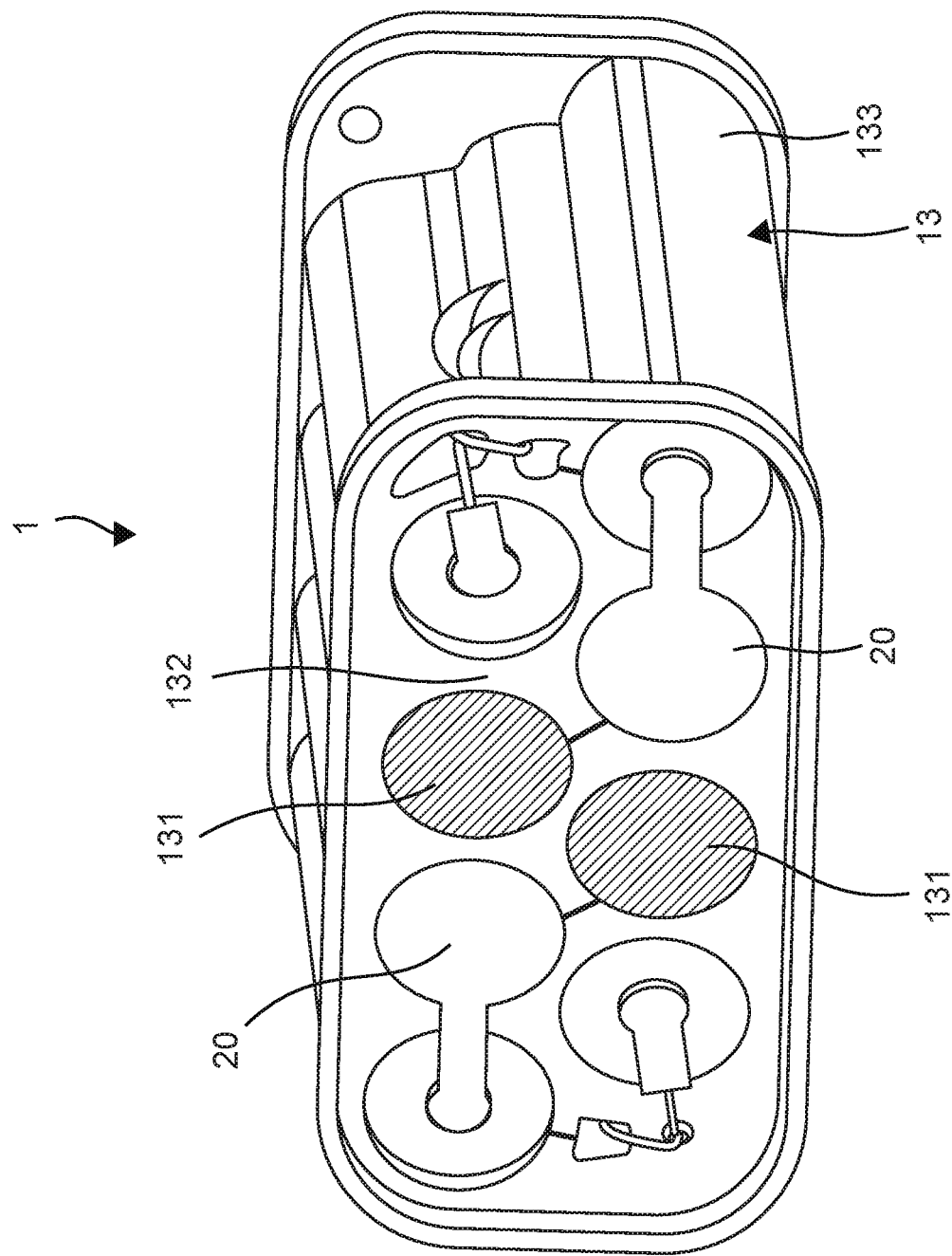
FIG. 2 is a view in perspective or three-quarter view of the battery pack of FIG. 1, partially assembled.

As can be seen in FIG. 2, the protective casing 13 comprises a peripheral wall 133 and several tubular housings 131 for receiving a cell 20.

The cells 20 are connected to each other in parallel or in series so as to create an electrical generator of desired voltage and capacity.

The casing 13 is made of plastic and the cells 20 are cells comprising lithium.

In this FIG. 2, the casing 13 is represented without the closing lids 11, without the metal plates 14 and without the insulating plates 12.

By way of an example, the width of the casing 13 is 95 mm, the height of the casing 13 is 64 mm (69 mm with the screws) and the thickness is equal to 44.5 mm.

Figure 4:
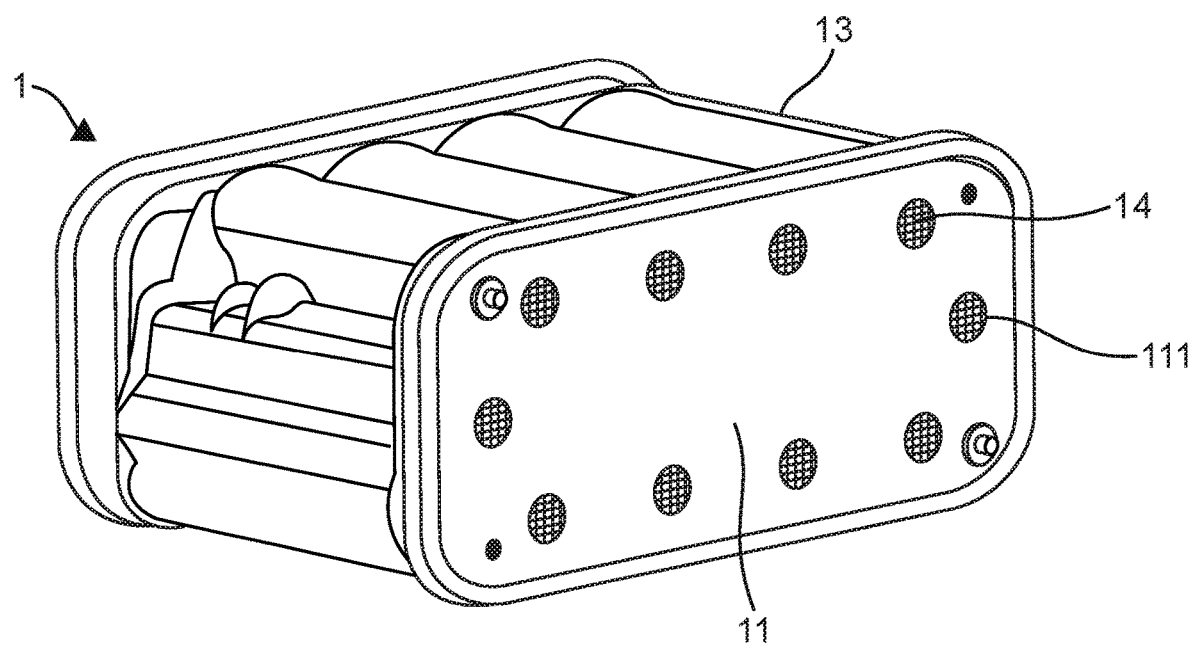
FIG. 4 is a view in perspective or three-quarter view of the battery pack of FIG. 1, once it has been assembled.

In FIG. 4, the battery pack 1 is assembled. In this figure, portions of the plate 14 made of metallic material can be seen through the holes 111 of the lid 11.

Figure 3:
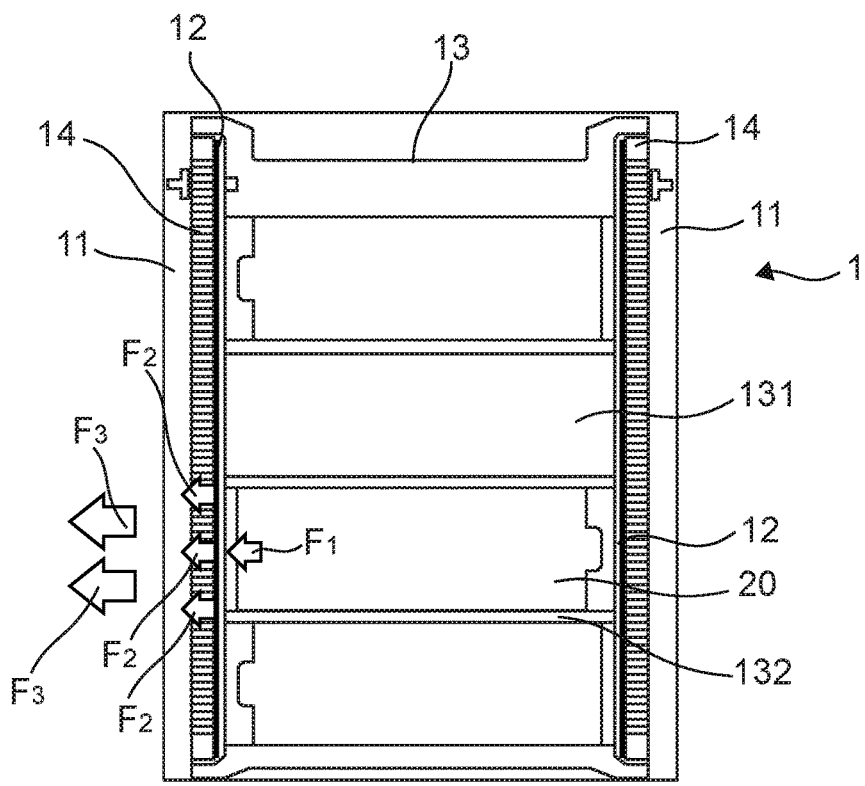
FIG. 3 is a schematic view in section of the battery pack of FIG. 1.

As illustrated in FIG. 3, the casing 13 has an internal structure that defines a path to make the thermal runaway gases circulate from a battery cell 20 to the exterior of the casing 13.

As emphasized here above, the plate 4 is permeable to the passage of fumes and comprises a mass of metallic material to absorb the heat in order to extinguish the flames that can appear during such thermal runaway.

Arrows F1 to F3 represent the path of flow for the discharging of hot gases from the interior of the casing 13, the hot gases escaping from the interior of the casing 13 to the exterior in passing by the plate 14.

When the cell referenced 20 of the plurality of cells goes into thermal runaway, it emits hot ignited gases (arrow F1) and the pressure within the casing 13 rises.

These ignited gases are directed through the insulating plate 12 and then the plate or layer 14 of metallic material (arrows F2) that takes the form of a network or lattice of metal wires (of the steelwool type) or the form of a metal foam to cool the gases and extinguish the flames.

The gases are then expelled in the form of fumes out of the casing 13 (arrows F3) without any flame going out of the casing 13.

The cells 20 are isolated from each other by plastic partition walls 132 with low thermal conductivity (meeting the reference UL94 standard classifying the flammability of plastic materials) thus preventing thermal runaway in the adjacent cells 20.

Each partition wall 132 is a barrier against the transfer of thermal energy between two cells 20 placed on either side of the wall.

Each partition wall 132 electrically and thermally insulates the cells 20 from one another.

In other words, the partition walls 132 protect the cells against the hot gases vented by a neighboring cell undergoing thermal firing.

To prevent excessively high and critical internal pressure, the exit of fumes through the venting holes 111 is implemented on each side of the battery pack 1.

The solution of the invention enables the cell undergoing thermal runaway to properly vent the hot gases while protecting the rest of the cell in the battery pack 1 against hot gases.

Such a solution prevents the expulsion of liquid and the propagation of flames towards the exterior of the battery pack 1.

The layer 14 of metallic material can have a thickness of 1 to 15 mm for example.

The invention claimed is:

1. A battery pack comprising:
a protective casing comprising a peripheral wall and being closed at first and second opposite ends by a lid, wherein each of the lids comprises at least one venting hole for gases that that can form inside the protective casing;
a plurality of electrical energy storage cells positioned in a parallel layout in the protective casing; and
at least one layer of metallic material, through which the gases are intended to flow, is disposed between an internal face of each of the lids and the plurality of electrical energy storage cells,
wherein each lid carries, on its internal face, at least one wall in the form of a baffle defining an indirect path of flow of the gases towards at least one of the at least one venting hole.

2. The battery pack according to claim 1, wherein the protective casing comprises several reception housings, each for receiving a cell of the plurality of electrical energy storage cells.

3. The battery pack according to claim 2, wherein partition walls made of plastic extend within the protective casing between the reception housings of neighboring ones of the plurality of electrical energy storage cells.

4. The battery pack according to claim 1, wherein said at least one layer of metallic material takes the form of a network of metal wires or of a metallic foam.

5. The battery pack according to claim 1, wherein the lids are reversibly affixed to said protective casing.

6. The battery pack according to claim 1, wherein the plurality of electrical energy storage cells are cells composed of lithium.

7. The battery pack according to claim 1, further comprising at least one layer of electrically insulating material disposed between said at least one layer of metallic material and the plurality of electrical energy storage cells.

8. A distress beacon comprising a battery pack, wherein the battery pack comprises:

a protective casing comprising a peripheral wall and being closed at first and second opposite ends by a lid, wherein each of the lids comprises at least one venting hole for gases that that can form inside the protective casing;

a plurality of electrical energy storage cells positioned in a parallel layout in the protective casing; and at least one layer of metallic material, through which the gases are intended to flow, is disposed between an internal face of each of the lids and the plurality of electrical energy storage cells, wherein each lid carries, on its internal face, at least one wall in the form of a baffle defining an indirect path of flow of the gases towards at least one of the at least one venting hole.

9. The battery pack according to claim 1, wherein the baffle prevents direct exit of the gases and increases their exit travel path towards the at least one venting hole.

10. The distress beacon according to claim 8, wherein the baffle prevents direct exit of the gases and increases their exit travel path towards the at least one venting hole.

* * * * *